June 13, 1933.    H. H. BENN    1,913,971
COMBINED COUPLING AND VALVE
Filed Aug. 25, 1932    2 Sheets-Sheet 1
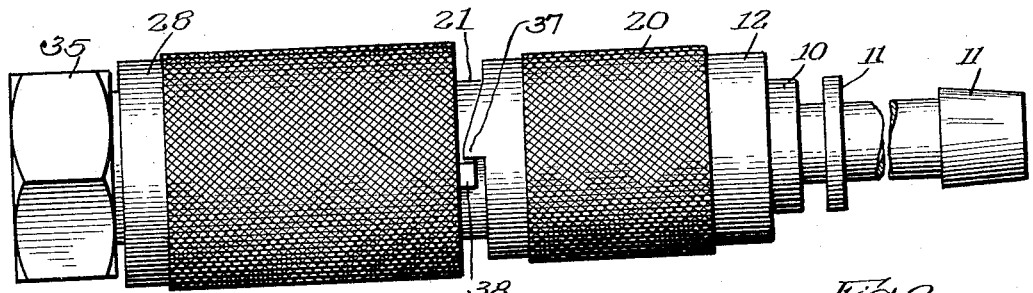
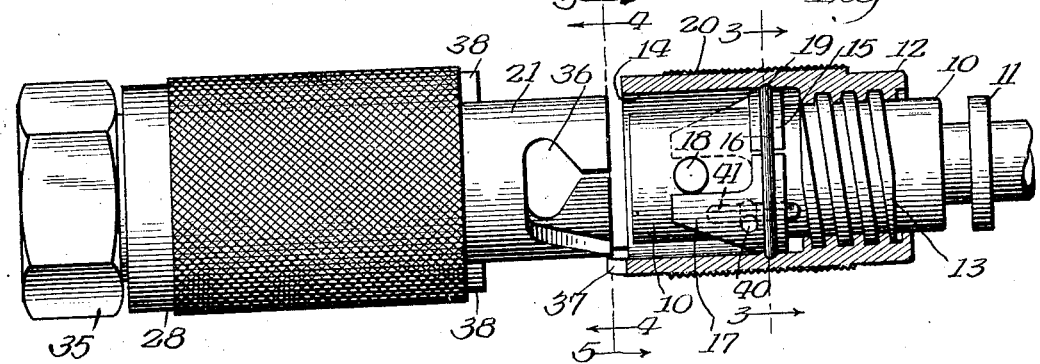
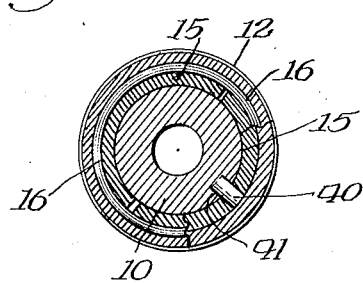
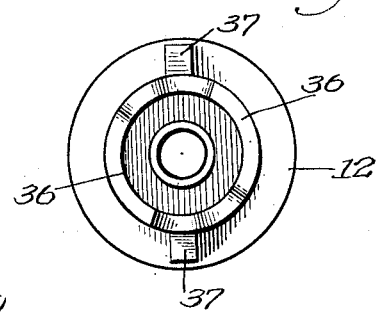
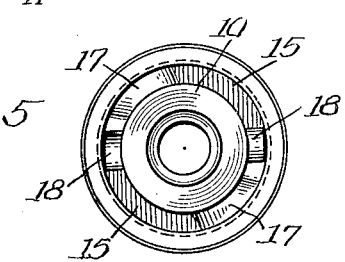
Inventor
Howard H Benn

June 13, 1933.  H. H. BENN  1,913,971
COMBINED COUPLING AND VALVE
Filed Aug. 25, 1932  2 Sheets-Sheet 2

Inventor
Howard H. Benn
By [signature] Atty

Patented June 13, 1933

1,913,971

UNITED STATES PATENT OFFICE

HOWARD H. BENN, OF JACKSON, MICHIGAN, ASSIGNOR TO F. L. PARSONS, OF DETROIT, MICHIGAN

COMBINED COUPLING AND VALVE

Application filed August 25, 1932. Serial No. 630,442.

This invention relates to an improved coupling for coupling together two conduits or pipes through which a fluid circulates and in connection with which coupling there is provided a valve whereby one of the conduits or pipes may be closed when it is desired to uncouple the pipes.

Heretofore in devices of this character, and especially in construction where the valve plug is stationary and the outer casing is rotatable with respect thereto for opening and closing the valve, it has been found that the valve is not always closed before the uncoupling is effected, which for many reasons is objectionable.

It is one of the objects of the present invention to overcome these difficulties and objections and to provide in a combined coupling and valve, means for locking the coupling after the pipes have been joined, and improved means whereby upon operation of the locking means to render the same inactive to permit uncoupling of the members, the valve will be automatically actuated to close the same.

A further object is to provide improved means for quickly retracting or rendering the actuating means for the coupling members inactive with respect to the valve mechanism.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention, and in which Figure 1 is a plan view of a coupling of this character constructed in accordance with the principles of this invention.

Figure 2 is a view similar to Figure 1 with the coupling members separated and with parts in section.

Figure 3 is a detail sectional view taken on line 3—3, Figure 2.

Figure 4 is a sectional view taken on line 4—4, Figure 2.

Figure 5 is a sectional view taken on line 5—5, Figure 2.

Figure 6:
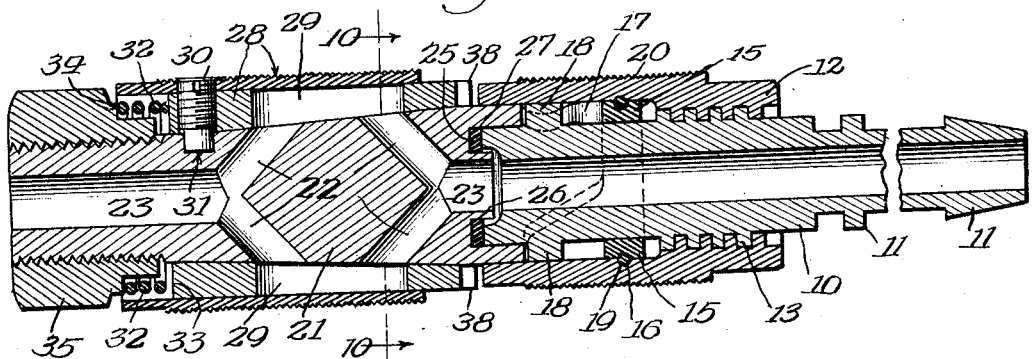
Figure 6 is a sectional view taken on line 6—6, Figure 7.

Referring more particularly to the drawings the numeral 10 designates a coupling member which is provided with shouldered portions 11 adapted to telescope into a hose pipe (not shown) to which the coupling member is secured. Mounted upon the coupling member 10 is a sleeve 12 which is connected to the coupling member through the medium of quick acting threads 13. A portion of the internal diameter of the sleeve 12 is enlarged as at 14 (see particularly Figure 2) to form a space between the portion of the coupling member 10 which is arranged within the sleeve. Encompassing the coupling member 10 within the sleeve are two semi-circular members 15 which are held together by means of an encompassing band 16 seated within grooves in the periphery of the members 15.

Connected with each of the semi-circular members 15 is a projection 17 and these projections contact with laterally projecting lugs 18 on the coupling member 10. The sleeve 12 is provided with an inwardly opening recess 19 into which the encompassing band 16 projects so that when the sleeve 12 is rotated with respect to the coupling member 10, the members 15 together with projections 17 thereon will travel lengthwise of the coupling member 10, for a purpose to be hereinafter set forth. If desired a portion of the outer surface of the sleeve 12 may be knurled as at 20, in order to facilitate rotation of the sleeve.

The other coupling member is preferably of a valve construction, comprising a valve plug 21 provided with passages 22 which communicate with passages 23 extending through the plug. The forward end of the plug is hollow as at 24 to receive the extremity of the coupling member 10. The base of the hollow portion of the plug 21 is preferably recessed as at 25 to form an upwardly projecting flange 26 and also to provide a seat for the reception of a gasket 27 adapted to be contacted by the end of the coupling member 10 so as to form a fluid tight joint.

Encompassing the valve plug 21 is a sleeve 28 which may be formed in any desired or suitable manner. Suffice it to say, that the sleeve encompasses the plug and is provided with elongated recesses 29 opening through the inner face thereof and so spaced that when the sleeve is rotated with respect to the valve plug the openings or passages 29 will be brought into and out of register with the passages 22 so as to permit fluid to flow through the valve plug and to shut such passages when the passages 29 are out of communication therewith. Carried by the sleeve 28 is a plug 30 which is adapted to enter and operate in a slot 31 in the valve plug and serves as a means for limiting the extent of rotation of the sleeve and valve one with respect to the other.

A spring 32 may be provided which encompasses a portion of the valve plug and abuts a shoulder 33 in the sleeve 28 and the other end of the spring abuts a shoulder 34 on a nut or collar 35 which is threaded upon the valve plug and the spring tends normally to hold the sleeve yieldingly pressed forward.

In the end of the valve plug adjacent the recessed portion 24 are bayonet slots 36 which open through the end of the valve and these bayonet slots are so positioned that the lugs 18 on the coupling member 10 may be inserted into the bayonet slots and then the coupling members rotated one with respect to the other to effect an interlocking engagement between the two coupling members. After the lugs 18 have been seated in the bayonet slots the sleeve 12 may then be rotated to advance the projections 17 on the members 15 causing them to form a closure for the bayonet slots and to engage the lugs 18 and force the latter into the ends of the bayonet slots.

To effect a coupling in the operation of the valve, the sleeve 12 is retracted upon the coupling member 10 so as to move the projections 17 on the members 15 backwardly with respect to the lugs 18 to permit the latter to enter the bayonet slots 36. When the lugs are inserted in the bayonet slots, the sleeve 12 is rotated upon the coupling member 10 causing the projections 17 to advance with respect to the coupling member 10 to form a closure for the bayonet slots and force the lugs 18 into the slots.

Figure 7:
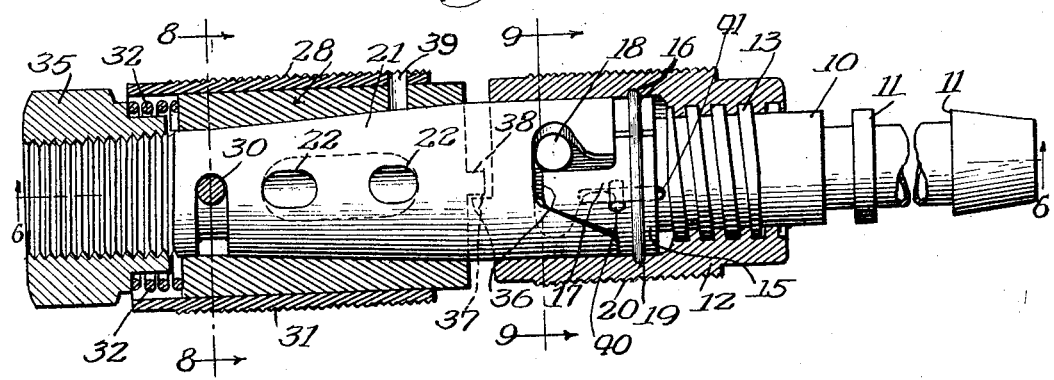
Figure 7 is a view partially in elevation and partially in section, showing the coupling members coupled together and in locked position and with the valve open.
Figure 8:
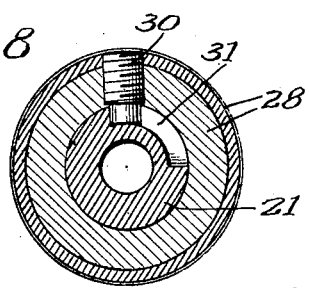
Figure 8 is a sectional view taken on line 8—8, Figure 7.
Figure 9:
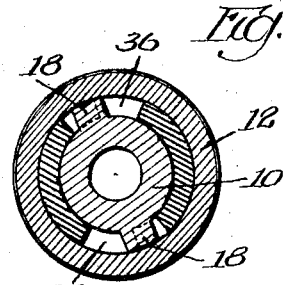
Figure 9 is a sectional view taken on line 9—9, Figure 7.
Figure 11:
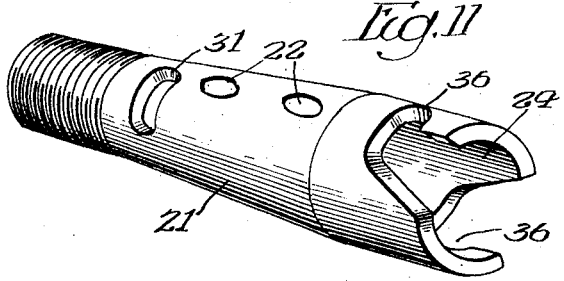
Figure 11 is a perspective view of the valve plug.
Figure 10:
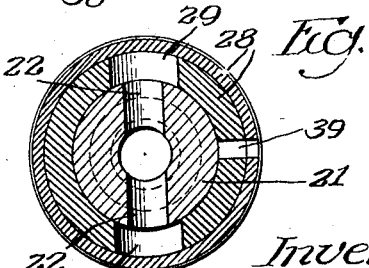
Figure 10 is a sectional view taken on line 10—10, Figure 6.

Previous, however, to the advancing of the sleeve 12 to the full extent of its movement, the sleeve 28 is rotated upon the valve plug until the sleeve 28 assumes the position shown in Figure 6, to cause the passages 29 to communicate with the passages 22 and thereby open the passage through the valve. This movement of the sleeve 28 in its opening direction will be limited by the pin or lug 30 engaging one wall of the slot 31. The sleeve 12 may be then further advanced until projections 37 on the sleeve assume the positions shown in Figure 7 with relation to lugs or projections 38 carried by the sleeve 28 or, if desired, the coupling members may be coupled together before the sleeve 28 is rotated to open the valve and in the latter instance when the sleeve 28 is thus operated, the projections 38 will assume the position shown in Figure 7 with respect to the shoulders 37.

To uncouple the members the sleeve 12 is rotated in a direction to withdraw the same with respect to the sleeve 28 but, as the shoulders 37 contact with the projections 38 this rotary movement of the sleeve 12 will also rotate the sleeve 28 a sufficient distance to cause the passages 28 to pass out of communication with the passages 29 and thereby close the valve.

By reason of the quick acting threads 13 the movement of the sleeve 12 will be such that by the time the sleeve 28 assumes a position to close the valve passages the shoulders or projections 37 on the sleeve 12 will, just before the sleeve 28 reaches the limit of its movement, move out of engagement with the lugs 38 on the sleeve 28 so as to allow the valve to remain closed. At the same time the sleeve 12 is being retracted the projections 17 will be withdrawn so as to unlock or open the bayonet slots to permit the coupling members to be separated.

In order to drain the pipe to which the valve plug 21 is connected, when the valve is closed, a bleed or drain opening 39 may be provided through the sleeve 28, and positioned so that when the valve plug 21 is moved to a closing position the opening 39 will register with one of the passages 22.

If desired, means may be provided for holding the members 15 against rotation about the coupling member 10, with the sleeve 12 and for that purpose there may be provided a pin 40 carried by one of the members 15 which project into and moves within an elongated slot or recess 41 in the coupling member 10, as shown more clearly in Figure 2.

With this improved construction it will be manifest that it will be impossible to uncouple the couplings without closing the valve and at the same time the valve may be closed while the parts are coupled, by rotating the sleeve 28 upon the valve plug. The shoulders 37 and 38 are so arranged as to permit of this independent rotation of the sleeve 28 when the coupling members are secured together.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. A coupling comprising two members one of which telescopes with the other, a slot opening through the end of one of the members, a lug carried by the other member and adapted to enter the said slot, means movably mounted upon one of the members for locking the lug in the slot, one of said members constituting a valve plug having a passage therethrough, means movably connected with the valve plug for controlling the said opening, and means whereby the last said means will be responsive in its movement with respect to said plug to the actuation of the first said means.

2. A coupling comprising two members one of which telescopes with the other, a slot opening through the end of one of the members, a lug carried by the other member and adapted to enter the said slot, means movably mounted upon one of the members for locking the lug in the slot, one of said members constituting a valve plug having a passage therethrough, means movably connected with the valve plug for controlling the said opening, means whereby the last said means will be responsive in its movement with respect to said plug to the actuation of the first said means, and means whereby the first said means will be automatically rendered inactive with respect to the second said means at a predetermined time in the cycle of operation of the first said means.

3. A coupling comprising two members one of which telescopes with the other, a slot opening through the end of one of the members, a lug carried by the other member and adapted to enter the said slot, means movably mounted upon one of the members for locking the lug in the slot, one of said members constituting a valve plug having a passage therethrough, means movably connected with the valve plug for controlling the said opening, means whereby the last said means will be responsive in its movement with respect to said plug to the actuation of the first said means, and means whereby the first said means will be moved into a position where it will be inactive with respect to the second recited means.

4. A coupling comprising two members one of which telescopes with the other, a slot opening through the end of one of the members, a lug carried by the other member and adapted to enter the said slot, means movably mounted upon one of the members for locking the lug in the slot, one of said members constituting a valve plug having a passage therethrough, means movably connected with the valve plug for controlling the said opening, means whereby the last said means will be responsive in its movement with respect to said plug to the actuation of the first said means, and a normally closed drain outlet adapted to be opened as the first said opening is closed.

5. A coupling including two members, one of said members including a valve structure embodying a stationary part and a rotatable part connected to and co-operating with the stationary part, interengaging means between one of the said parts of the valve structure and the other member of the coupling for releasably securing the coupling members together, means movably connected with one of the coupling members for locking the parts against separation, and means whereby upon operation of the last said means to permit separation of the coupling members the said movable valve part will be actuated with respect to the stationary valve part to close the valve passage.

6. A coupling including two members, one of said members including a valve structure embodying a stationary part and a rotatable part, means for detachably securing one of the valve parts to the other coupling member to effect a coupling, means for locking the parts against separation, means for actuating said locking means and embodying a collar rotatably connected with one of the coupling members, and means connected with the collar and adapted to engage a formation on the movable valve member for actuating the latter when said collar is operated to unlock the coupling members.

7. A coupling embodying two members to be connected, means for detachably connecting the members together, locking means for securing the members against separation, means for actuating the locking means to render the same active and inactive, a valve in one of the coupling members, and means whereby the operation of said actuating means will operate the said valve.

8. A coupling embodying two members to be connected, means for detachably connecting the members together, locking means for securing the members against separation, means for actuating the locking means to render the same active and inactive, a rotatable valve in one of the coupling members, and means whereby the operation of said actuating means will rotate the said valve.

9. A coupling embodying two members to be connected, means for detachably connecting the members together, locking means for securing the members against separation, means for actuating the locking means to render the same active and inactive, a valve in one of the coupling members, means whereby the operation of said actuating means will operate the said valve, and means operating during the operation of said actuating means to render the said actuating means inactive with respect to said valve.

10. A coupling embodying two members to be connected, means for detachably connecting the members together, locking means for securing the members against separation, means for actuating the locking means to render the same active and inactive, a valve in one of the coupling members, means whereby the operation of said actuating means will operate the said valve, and means rendered active to drain the coupling member to which the valve is connected, when said valve is closed.

11. A coupling embodying two members to be connected, means for detachably securing the members together, locking means for the coupling members embodying an element movable upon one of the coupling members, a valve in the other coupling member, and means on the valve adapted to be engaged by said element when the latter is moved to unlock the coupling members for rotating the valve to close the latter.

12. A coupling embodying two members to be connected, means for detachably securing the members together, locking means for the coupling members embodying an element movable upon one of the coupling members, a valve in the other coupling member, means on the valve adapted to be engaged by said element when the latter is moved to unlock the coupling members for rotating the valve to close the latter, and means for retracting the said element out of engaging relation with the valve at a predetermined time in the cycle of movement of said element.

In testimony whereof I have signed my name to this specification, on this 22nd day of August, A. D. 1932.

HOWARD H. BENN.